(12) United States Patent
Atteberry

(10) Patent No.: US 11,712,590 B2
(45) Date of Patent: Aug. 1, 2023

(54) HEMP INSULATION FIRE RETARDANT APPLICATOR AND METHOD

(71) Applicant: Wade Atteberry, Fillmore, CA (US)

(72) Inventor: Wade Atteberry, Fillmore, CA (US)

(*) Notice: Subject to any disclaimer, the term of this patent is extended or adjusted under 35 U.S.C. 154(b) by 156 days.

(21) Appl. No.: 17/183,566

(22) Filed: Feb. 24, 2021

(65) Prior Publication Data

US 2022/0266076 A1    Aug. 25, 2022

(51) Int. Cl.
*A62C 3/00* (2006.01)
*F16L 59/02* (2006.01)

(52) U.S. Cl.
CPC ............ *A62C 3/00* (2013.01); *F16L 59/026* (2013.01)

(58) Field of Classification Search
CPC .................................. A62C 3/00; F16L 9/026
USPC .............. 169/45, 48; 239/271; 442/136, 138
See application file for complete search history.

(56) References Cited

U.S. PATENT DOCUMENTS

| 4,132,655 | A | * | 1/1979 | Draganov | ............... C08K 3/30 169/45 |
| 4,184,311 | A | * | 1/1980 | Rood | ....................... E04B 1/94 106/18.14 |
| 5,642,601 | A | * | 7/1997 | Thompson, Jr. | ......... D04H 1/54 428/921 |
| 2011/0027500 | A1 | * | 2/2011 | Hanna | ...................... B32B 3/08 428/137 |

FOREIGN PATENT DOCUMENTS

CA        2985996 A1    5/2019

OTHER PUBLICATIONS

Zhao, W.J., In Situ Inorganic Flame Retardant Modified Hemp and its Polypropylene Composites, Journal, Jun. 2017, 32236-32245, 7, Royal Society of Chemistry, United Kingdom.

* cited by examiner

*Primary Examiner* — Steven J Ganey
(74) *Attorney, Agent, or Firm* — James G. Passe; Passe Intellectual Property LLC

(57) ABSTRACT

A device and a method for applying a liquid fire retardant onto hemp fibers and into hemp insulation batting using a multiple needle construction, which can act as an insulation substitute to be used in building structures that does not irritate the skin or contain harmful, toxic elements and is a quicker and a more efficient method with a reduction in drying time.

6 Claims, 3 Drawing Sheets by # US 11,712,590 B2

HEMP INSULATION FIRE RETARDANT APPLICATOR AND METHOD

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a device and method for applying fire retardant to hemp insulation. In particular, it relates to the injection of fire retardant into hemp building insulation.

Description of Related Art

The use of hemp batts and blocks as building insulation has recently been developed. In use, blocks of hemp batting are stacked vertically in studded cavities of walls, which provide an effective and renewable insulation material. However, dried hemp is flammable, and as such, presents a hazard for using hemp as insulation in a building.

Fire retardants are well known and they have been used in applications to modified hemp, though not for the use in hemp insulation batting. The flame retardant has been applied using the melt blending method. While this method does apply fire retardant to hemp, it is done prior to batting block formation and does little or nothing to introduce retardant into the fibers of the hemp being treated. This improves the fire-resistant properties, but the process is inefficient, difficult to do, and not entirely effective. Clearly, there is a need for a more effective way to apply fire retardant to hemp insulation batting.

BRIEF SUMMARY OF THE INVENTION

The present invention relates to the discovery that fire retardant can be applied to hemp insulation batting blocks by use of a multiple injection needle construction that applies fire retardant onto and into the hemp fibers of the hemp batting blocks. This new method overcomes some of the limitations of previous methods, such as soaking, by reducing the dry time of the hemp insulation batting block.

Accordingly, in one embodiment, there is a method of injecting a liquid fire retardant onto and into hemp insulation batting having six sides comprising:
a) selecting a device which delivers a liquid fire retardant under pressure to a plurality of injection needles having one or more holes;
b) positioning the plurality of injection needles such that they do not move substantially relative to one another;
c) pressing the plurality of injection needles into the hemp insulation batting;
d) delivering the liquid fire retardant to the plurality of needles such that the liquid fire retardant exits the plurality of injection needles through one or more holes; and
e) removing the plurality of injection needles from the hemp insulation batting.

In another embodiment, there is a device for delivering a liquid fire retardant onto and into the fibers of hemp insulation batting comprising:
a) a pressure pump connected to a container containing a liquid fire retardant;
b) a base holding a plurality of injection needles, the injection needles having one or more exit holes for delivering the liquid fire retardant and are held in place by a ridged base in a fixed relationship;
c) at least one of tubing and conduit connected to both the container and the plurality of injection needles for delivering the liquid fire retardant from the container to the injection needles; and
d) a valve for opening and closing the connection between the container and the injection needles.

DETAILED DESCRIPTION OF THE INVENTION

Figure 1:
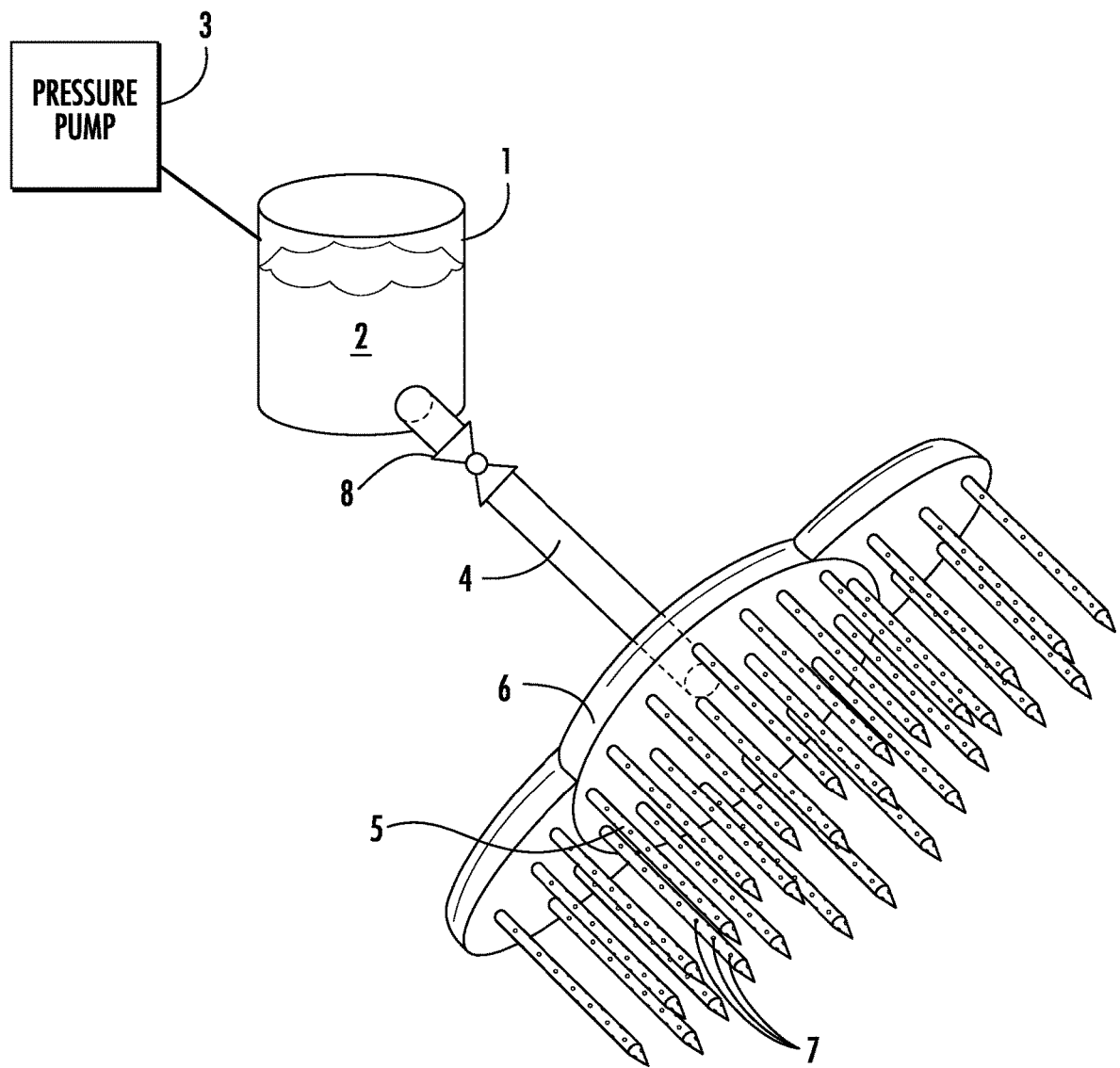
FIG. 1 is a perspective view of a device for injecting liquid fire retardant onto and into a hemp insulation batting of the present invention.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "injecting a liquid fire retardant" refers to the process of using needles with apertures to deposit liquid fire retardant both onto the fibers of the hemp insulation and also into the fibers of the hemp insulation batting so as to penetrate the hemp fibers. It is discovered that this method is far superior to the method of soaking the fibers in liquid fire retardant. It is both a quicker and a more efficient use of fire retardant. It also allows the hemp fibers to dry more quickly vs. soaking fibers in liquid fire retardant.

As used herein, the term "device" refers to a mechanism which delivers a liquid fire retardant under pressure to a plurality of injection needles having one or more holes. The device consists of a tank to hold the liquid fire retardant, a body to hold the injection needles and deliver liquid fire retardant to the needles, and injection needles. For example, in one embodiment, a pump is used to create pressure to drive the liquid fire retardant into the injection needles and exit out of the injection needles.

As used herein, the term "pressure" refers to sufficient pressure to drive the liquid fire retardant so it exits out through the holes in the needles.

As used herein, the term "liquid fire retardant" refers to a chemical substance that is liquid or dissolves in a liquid, Ike water, that is used to slow down or stop the spread of fire or reduce its intensity. This is commonly accomplished by chemical reactions that reduce the flammability of fuels or delay their combustion. Fire retardants may also cool the fuel through physical action or endothermic chemical reactions. Are retardants are available in powder form to be mixed with water as firefighting foams and as fire retardant gels. Examples of acceptable liquid fire retardants for use on hemp insulation include boratic acid and sodium borate, but any liquid fire retardant is anticipated.

As used herein, the term "injection needles" refers to a very thin, hollow, pointed piece of metal with one or more exit holes located on the hollow portion of the needle and having one inlet hole located on the hollow portion of the needle that is connected under pressure, either directly or indirectly to the tank, holding liquid fire retardant and is used to inject and deposit liquid fire retardant in and around the hemp insulation batting fibers, where one or more needles is inserted into the hemp insulation batting. In one embodiment, there is one exit hole. In another embodiment, there are from one to six exit holes. In yet another embodiment, the needles are embedded in a polymer base. In one embodiment, there are between 8 and 36 needles per square foot. In one embodiment, there are essentially enough needles to inject liquid fire retardant entirely into the hemp insulation batting in one pass. In one embodiment, the length of the injection needles is such that it matches at least the width of the hemp insulation batting.

As used herein, the term "insert the injection needles into the hemp insulation batting" refers to the method of using the device of the present invention. In the present invention, there is a method of injecting a liquid fire retardant onto and into hemp insulation batting having six sides comprising:
 a) selecting a device which delivers a liquid fire retardant under pressure to a plurality of injection needles having one or more holes;
 b) positioning the plurality of injection needles such that they do not move substantially relative to one another;
 c) pressing the plurality of injection needles into the hemp insulation batting;
 d) delivering the liquid fire retardant to the plurality of needles such that the liquid fire retardant exits the plurality of injection needles through one or more holes; and
 e) removing the plurality of injection needles from the hemp insulation batting.

As used herein, the term "hemp insulation batting" refers to natural hemp fiber insulation batting that is an all-natural, thermal insulation material. It is composed of a hemp fiber that can replace glass fiber. Hemp insulation batts are lightweight, easy to handle, flexible, and contribute to better in-home air quality. One source of purchasing hemp insulation batting is through a company named ecoHOME located in Canada, who distributes their product without fire retardant. Hemp insulation batting provides the functionality of traditional fiberglass insulation without irritating the skin or containing harmful, toxic elements. Typical batts in one embodiment, are of the dimension 15.5 inches by 48 inches with a thickness from 2-4 to 6-8 inches, and are routinely placed in cavities of walls as building insulation.

As used herein, the term "deliver the liquid fire retardant" refers to the liquid fire retardant passing from the container via pressure into and out of the injection needles once the needles are pressed into the hemp insulation batting.

DRAWINGS

Now referring to the drawings, FIG. 1 is a perspective view of the device of the present invention. In this view, container 1 houses a liquid fire retardant 2. Pressure, in this embodiment, is maintained by a pressure pump 3, maintaining a pump pressure of between about 10 and about 120 psi when liquid fire retardant 2 is delivered from the container 1. When the device is in use, the valve 8 is open and liquid fire retardant 2 is pushed through tubing or conduit 4 and into injection needles 5, which are held in space relationship to one another in base 6. Each injection needle 5 has one of more exit holes 7 for delivering the liquid fire retardant 2 out of the injection needles 5 and deposited into and onto the hemp insulation batting (not shown in this view).

Figure 2:
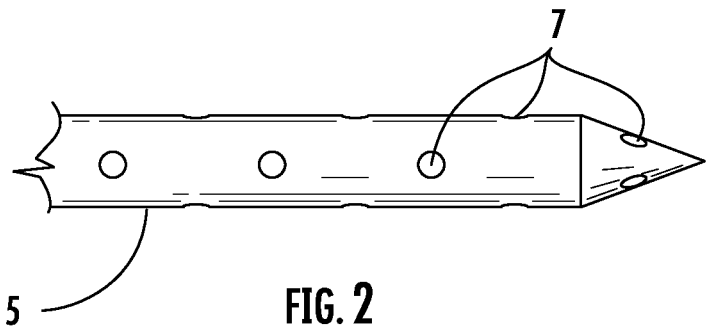
FIG. 2 is a close up of an injection needle showing the holes in the needle for exit and delivery of the liquid fire retardant of the present invention.
Figure 3:
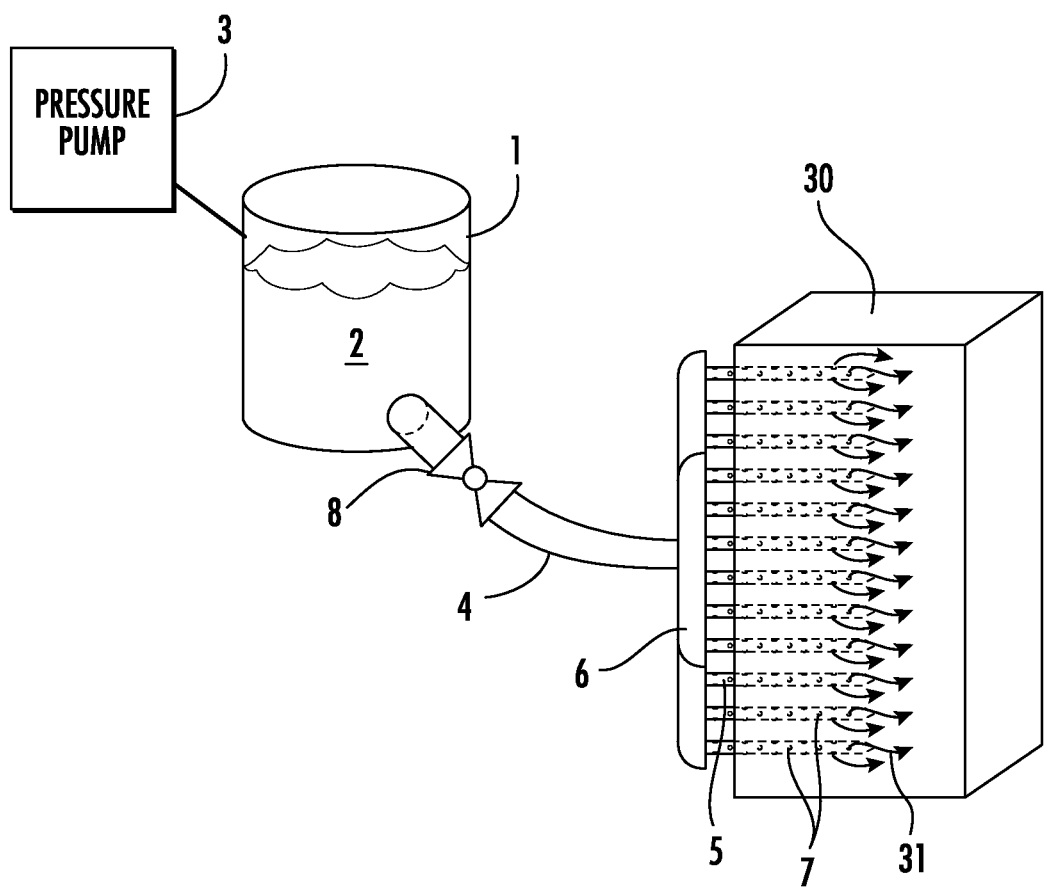
FIG. 3 is a perspective view of the device of the present invention injecting liquid fire retardant into a hemp insulation batt.

FIG. 2 is a side perspective view of one of the injection needles 5 showing the exit holes 7. FIG. 3 is a perspective view of the device 1 in use of the method of the present invention. In this view, the injection needles 5 have been inserted into the length of the hemp insulation batting 30 and liquid fire retardant 2 is being pumped into and is exiting out of the injection needles 31 for deposit onto and into the hemp insulation batting.

Figure 4:
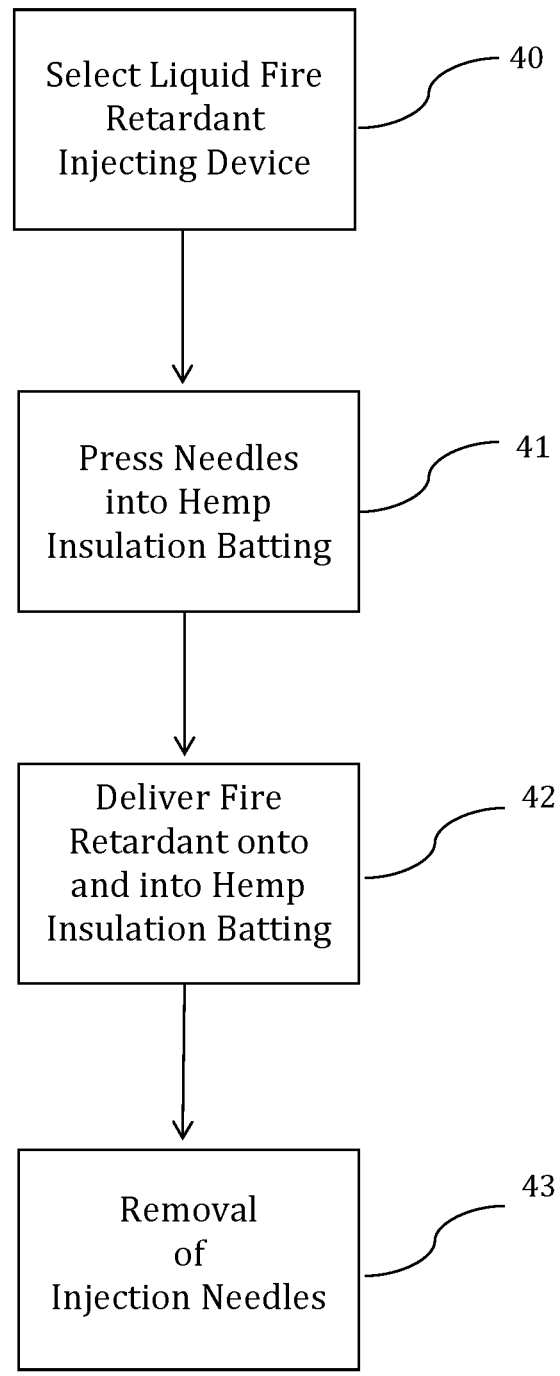
FIG. 4 is a flow chart of the method of the present invention.

FIG. 4 is a flow chart of the method of the present invention. In this method, a liquid fire retardant injecting device is selected 40. The needles of the device are inserted into hemp insulation batting 41. The liquid fire retardant is then delivered into and onto the hemp insulation batting 42, followed by the removal of the injection needles 43 once the desired amount of fire retardant is delivered. The volume of liquid fire retardant needed will depend on the fire retardant and the size of the hemp insulation batting.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A method of injecting a liquid fire retardant onto and into hemp insulation batting having six sides comprising:
   a) selecting a device which delivers a liquid fire retardant under pressure to a plurality of injection needles having one or more holes;
   b) positioning the plurality of injection needles such that they do not move substantially relative to one another;
   c) pressing the plurality of injection needles into the hemp insulation batting;
   d) delivering the liquid fire retardant to the plurality of needles such that the liquid fire retardant exits the plurality of injection needles through the one or more holes; and
   e) removing the plurality of injection needles from the hemp insulation batting.

2. The method of injecting a liquid fire retardant onto and into hemp insulation batting according to claim 1 wherein the liquid fire retardant is under a pressure of from about 10 to about 120 psi.

3. The method of injecting a liquid fire retardant onto and into hemp insulation batting according to claim 1 wherein the fire retardant is selected from the group consisting of boratic acid and sodium borate.

4. The method of injecting a liquid fire retardant onto and into hemp insulation batting according to claim 1 wherein the selected device has between 8 and 36 injection needles per square foot.

5. The method of injecting a liquid fire retardant onto and into hemp insulation batting according to claim 1 wherein the plurality of injection needles are positioned such that they do not move substantially relative to one another by embedding each of the plurality of injection needles in a polymer base.

6. The method of injecting a liquid fire retardant onto and into hemp insulation batting according to claim 1 wherein liquid fire retardant is injected into each of the six sides of the hemp insulation.

\* \* \* \* \*